(12) United States Patent
DeLuca

(10) Patent No.: US 10,339,119 B2
(45) Date of Patent: Jul. 2, 2019

(54) CALIBRATION OF A FIRST SEARCH QUERY BASED ON A SECOND SEARCH QUERY

(71) Applicant: International Business Machines Corporation, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/238,805

(22) Filed: Aug. 17, 2016

(65) Prior Publication Data

US 2018/0052873 A1 Feb. 22, 2018

(51) Int. Cl.
*G06F 17/30* (2006.01)
*G06F 16/21* (2019.01)
*G06F 16/25* (2019.01)
*G06F 16/2455* (2019.01)
*G06F 16/9032* (2019.01)
*G06F 16/332* (2019.01)

(52) U.S. Cl.
CPC ........ *G06F 16/217* (2019.01); *G06F 16/2455* (2019.01); *G06F 16/252* (2019.01); *G06F 16/3325* (2019.01); *G06F 16/90324* (2019.01)

(58) Field of Classification Search
CPC ................................................ G06F 17/30867
USPC .................. 707/705, 706, 200, 726, 767
See application file for complete search history.

(56) References Cited

U.S. PATENT DOCUMENTS

| | | | |
|---|---|---|---|
| 8,489,641 B1 * | 7/2013 | Seefeld ............. | G06F 17/30241 707/792 |
| 8,914,358 B1 | 12/2014 | Pearson et al. | |
| 9,251,292 B2 | 2/2016 | Cheng et al. | |
| 9,305,102 B2 * | 4/2016 | Duleba ............. | G06F 17/30867 |
| 2014/0250115 A1 | 9/2014 | Yang | |
| 2014/0365580 A1 | 12/2014 | Azenkot et al. | |

OTHER PUBLICATIONS

Appendix P, "List of IBM Patents or Patent Applications Treated as Related", 2 pages.
To, Baoquoc N., U.S. Appl. No. 15/238,897, Office Action dated Jun. 4, 2018, 20 pgs.
To, Baoquoc N., U.S. Appl. No. 15/238,897, Final Office Action dated Dec. 31, 2018, 11 pgs.
U.S. Appl. No. 15/238,897, Notice of Allowance dated Mar. 8, 2019, 11 pgs.

* cited by examiner

*Primary Examiner* — Baoquoc N To
(74) *Attorney, Agent, or Firm* — Isaac J. Gooshaw; Hunter E. Webb; Keohane & D'Alessandro PLLC

(57) ABSTRACT

Approaches presented herein enable calibrating site-level search results by associating a set of search results of a second search query with a first search query for subsequent uses of the first search query. Specifically, a first result set is generated from a first search query. The first result set does not include one or more desired query results. A second result set is generated from a second search query. The second result set includes the one or more desired query results. The second result set is associated with the first search query so as to include the one or more desired query results when the first search query is subsequently executed.

20 Claims, 7 Drawing Sheets

| SEARCH QUERY | DocID_1 | Rel_1 | DocID_2 | Rel_2 | DocID_3 | Rel_3 | DocID_4 | Rel_4 | DocID_5 | Rel_5 | DocID_6 | Rel_6 |
|---|---|---|---|---|---|---|---|---|---|---|---|---|
| HOW TO FIX A LEAKY FAUCET? | 155 | 2 | 199 | 1 | | | | | | | | |
| FAUCET REPAIR | 155 | 5 | 130 | 5 | 134 | 5 | 141 | 4 | 155 | 3 | 99 | 2 |
| REFRIGERATORS | 155 | 5 | 883 | 4 | 654 | 4 | 555 | 3 | | | | |

| DocID | DisplayInfo | DocLocation |
|---|---|---|
| 125 | FAUCET REPAIR KITS | http://www.ACMEdepot.site/faucetrepairkits.html |
| 130 | FAUCET REPAIR VALVES | http://www.ACMEdepot.site/faucetrepairvalves.html |

| SEARCH QUERY | DocID_1 | Rel_1 | DocID_2 | Rel_2 | DocID_3 | Rel_3 | DocID_4 | Rel_4 | DocID_5 | Rel_5 | DocID_6 | Rel_6 | DocID_7 | Rel_7 |
|---|---|---|---|---|---|---|---|---|---|---|---|---|---|---|
| HOW TO FIX A LEAKY FAUCET? | 125 | 5 | 130 | 5 | 134 | 5 | 141 | 4 | 155 | 3 | 99 | 2 | | |
| FAUCET REPAIR | 125 | 5 | 130 | 5 | 134 | 5 | 141 | 4 | 155 | 3 | 199 | 1 | 99 | 2 |

CALIBRATION OF A FIRST SEARCH QUERY BASED ON A SECOND SEARCH QUERY

TECHNICAL FIELD

This invention relates generally to calibrating site-level search results and, more specifically, to calibrating site-level search results by associating a set of search results of a second search query with a first search query for subsequent uses of the first search query.

BACKGROUND

The online and offline consumer experience can vary greatly. In a physical store, consumers can use physical cues to assess the professionalism and competency of an establishment, such as how the employees are dressed, how the consumer is greeted, and the organization and cleanliness of the store. For an ecommerce merchant, these cues are absent. The design, processes, and content determine how a potential buyer perceives and ultimately interacts with a business. For many consumers, trusting an online merchant with payment information, to deliver the product on time, and to provide service after the sale are potential impediments to the buying process. A positive consumer experience can lead to more sales and good word of mouth. A negative experience may not only diminish the potential for future sales, but can also lead to negative word of mouth that may hinder new consumer acquisition. Even though technology has made building and maintaining an ecommerce site easier than ever, it is important that the online merchant evaluate and continue to improve the experience of its consumers.

SUMMARY

In general, embodiments of the present invention provide for calibrating site-level search results by associating a set of search results of a second search query with a first search query for subsequent uses of the first search query. Specifically, a first result set is generated from a first search query. The first result set does not include one or more desired query results. A second result set is generated from a second search query. The second result set includes the one or more desired query results. The second result set is associated with the first search query so as to include the one or more desired query results when the first search query is subsequently executed.

One aspect of the present invention includes a computer-implemented method for calibrating site-level search results, the method comprising: generating a first result set based on an execution of a first search query; determining, based on an analysis of the first result set, the first result set does not include one or more desired query results; generating a second result set based on an execution of a second search query; determining, based on an analysis of the second result set, the second result set includes the one or more desired query results; and associating the second result set with the first search query so as to display the one or more desired query results when the first search query is subsequently executed.

Another aspect of the present invention includes a computer program product for calibrating site-level search results, and program instructions stored on the computer readable storage device, to: generate a first result set based on an execution of a first search query; determine, based on an analysis of the first result set, the first result set does not include one or more desired query results; generate a second result set based on an execution of a second search query; determine, based on an analysis of the second result set, the second result set includes the one or more desired query results; and associate the second result set with the first search query so as to display the one or more desired query results when the first search query is subsequently executed.

Yet another aspect of the present invention includes a computer system for calibrating site-level search results, the computer system comprising: a memory medium comprising program instructions; a bus coupled to the memory medium; and a processor for executing the program instructions, the instructions causing the system to: generate a first result set based on an execution of a first search query; determine, based on an analysis of the first result set, the first result set does not include one or more desired query results; generate a second result set based on an execution of a second search query; determine, based on an analysis of the second result set, the second result set includes the one or more desired query results; and associate the second result set with the first search query so as to display the one or more desired query results when the first search query is subsequently executed.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 4A shows an example data structure 410 for implementing document index database 117 according to illustrative embodiments;

FIG. 4B shows an example data structure 420 for implementing document file database 118 according to illustrative embodiments;

FIG. 4C shows updated rows 430 in document index database 117 according to illustrative embodiments;

Figure 1:
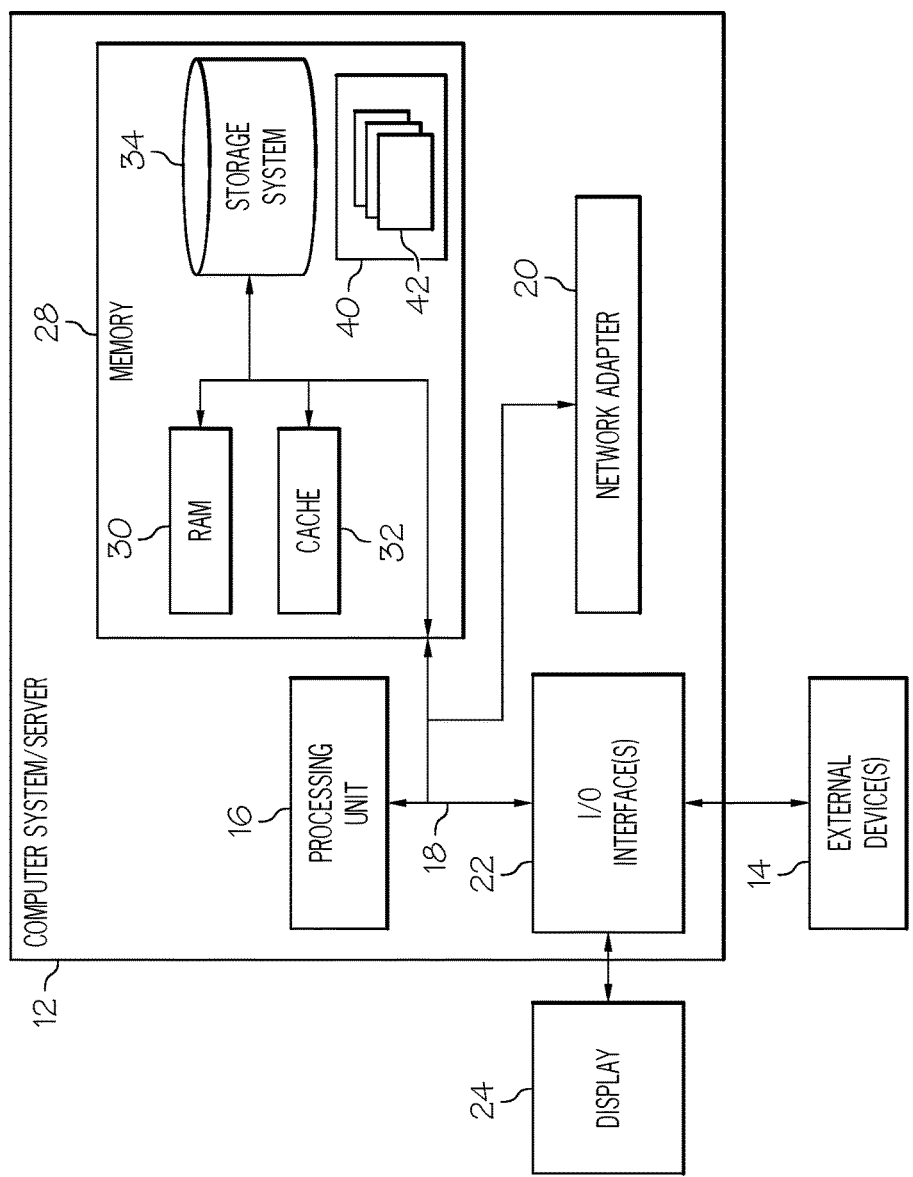
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention provide for calibrating site-level search results by associating a set of search results of a second search query with a first search query for subsequent uses of the first search query. Specifically, a first result set is generated from a first search query. The first result set does not include one or more desired query results. A second result set is generated from a second search query. The second result set includes the one or more desired query results. The second result set is associated with the first search query so as to include the one or more desired query results when the first search query is subsequently executed.

The inventors of the invention described herein have recognized certain deficiencies in known methods for calibrating a site-level search. Typically, a site administrator may test a search engine by entering a number of test searches when setting up or testing a website (e.g., a commerce site). For example, the site administrator may enter "How to fix a leaky faucet?" in a first search, and search results of little to no relevance are displayed. As a result, the site administrator types in a second search term, for example "Faucet repair", which returns a more relevant set of search results. The approaches described herein provide a seamless way for calibrating site-level search results by associating a set of search results of a second search query with a first search query for subsequent uses of the first search query.

Referring now to FIG. 1, a computerized implementation 10 of an embodiment for calibrating site-level search results by associating a set of search results of a second search query with a first search query for subsequent uses of the first search query will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for calibrating site-level search results by associating a set of search results of a second search query with a first search query for subsequent uses of the first search query. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for calibrating site-level search results by associating a set of search results of a second search query with a first search query for subsequent uses of the first search query, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2A:
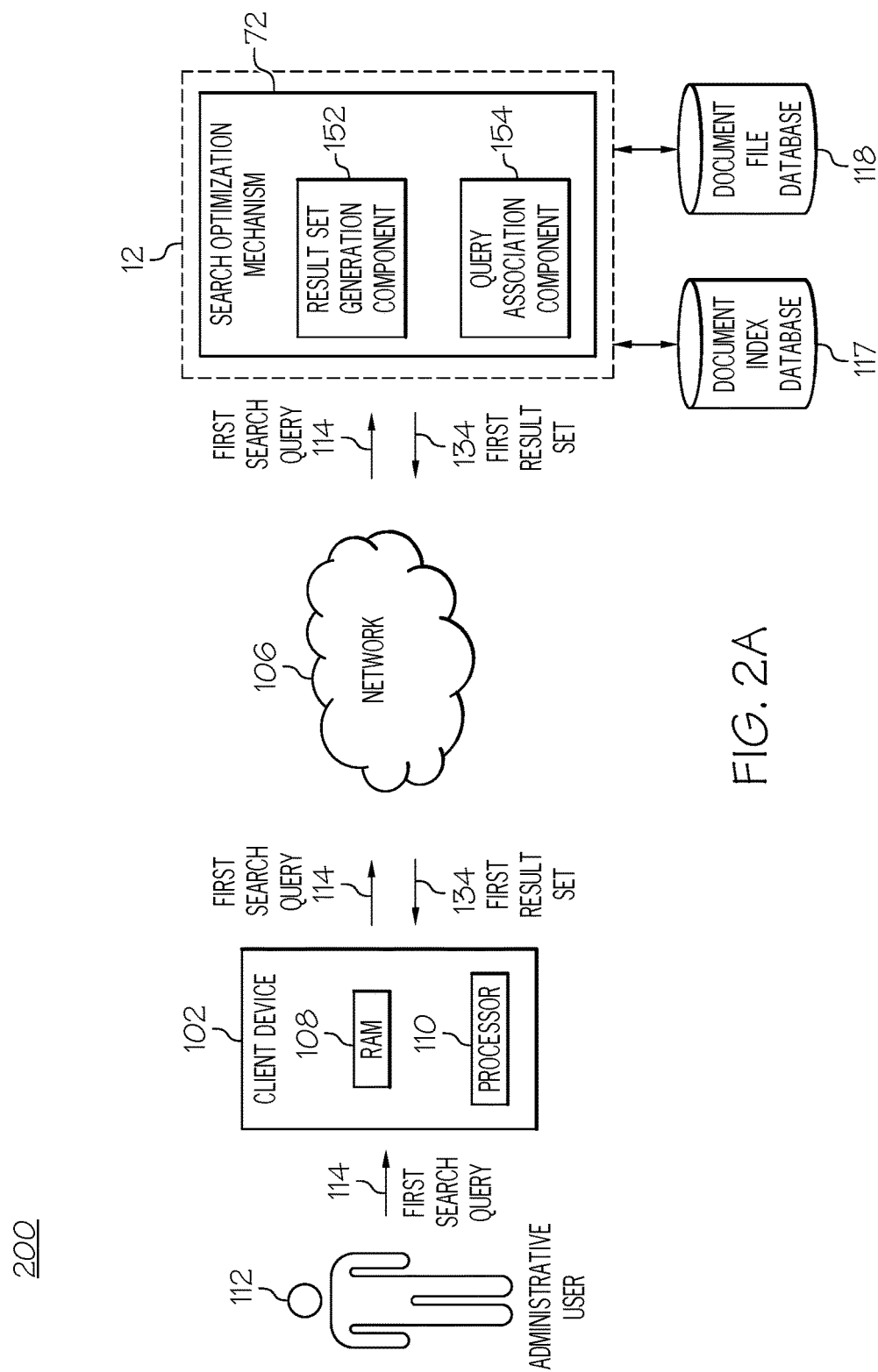
FIGS. 2A-B show schematic diagrams 200, 250 illustrating an exemplary environment for implementation according to illustrative embodiments.
Figure 2B:
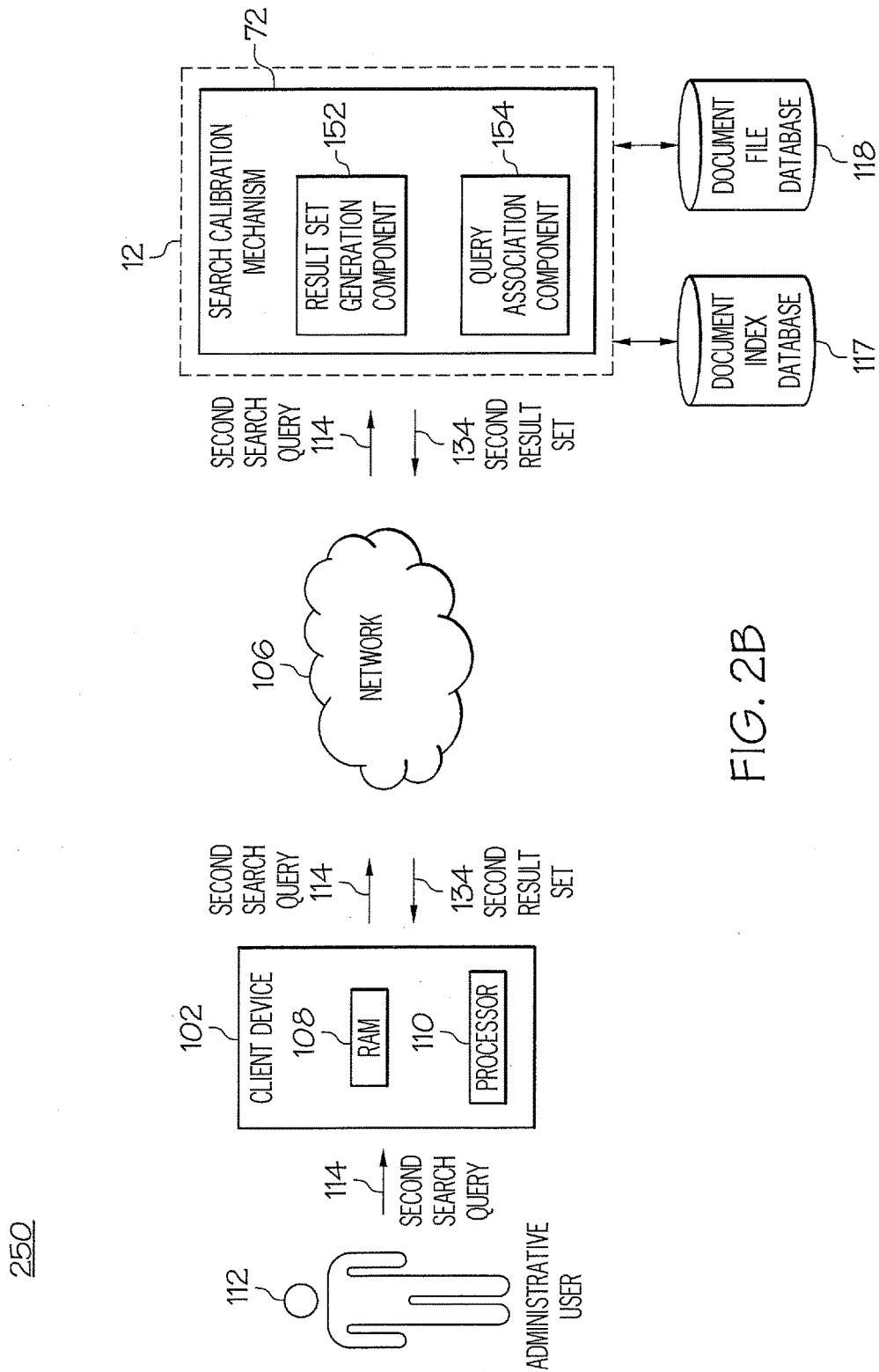

Referring now to FIGS. 2A-B, block diagrams 200, 250 describing the functionality discussed herein according to an embodiment of the present invention are shown. It is understood that the teachings recited herein may be practiced within any type of computing environment (e.g., computer system/server 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a search calibration mechanism 72 (hereinafter "system 72"). Rather, system 72 could be loaded on a server or server-capable device that communicates (e.g., wirelessly) with the physical server to provide search calibration therefor. Regardless, as depicted, system 72 can be implemented as program/utility 40 on computer system/server 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIGS. 2A-B for brevity purposes.

As shown, FIGS. 2A-B include client device 102 in communication with computer system/server 12 over network 106. The network 106 shown includes the Internet. In other embodiments, other wired and wireless networks, such as an intranet may be used. Moreover, methods according to the present invention may operate within a single computer.

Client devices 102 includes a computer-readable medium, such as a random access memory (RAM) 108 coupled to a processor 110. The processor 110 executes computer-executable program instructions stored in memory 108 as program code. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may comprise code from any computer-programming language, including, for example, C, C++, C#, Visual Basic, Java, Python, Perl, and/or JavaScript.

Client device 102 may also include a number of external or internal devices such as a mouse, a CD-ROM, DVD, a keyboard, a display, or other input or output devices. Examples of client device 102 are personal computers, digital assistants, personal digital assistants, cellular phones, mobile phones, smart phones, pagers, digital tablets, laptop computers, Internet appliances, and other processor-based devices. In general, client device 102 may be any type of processor-based platform that is connected to network 106 and that interacts with one or more application programs. Client device 102 may operate on any operating system capable of supporting a browser or browser-enabled application, such as Microsoft® Windows® or Linux. Client device 102 can include, for example, a personal computer executing a browser application program such as Internet Explorer™ from Microsoft Corporation, Netscape Navigator™ from Netscape Communications Corporation, and/or Safari™ from Apple Computer, Inc. Through client device 102, administrative user 112 can communicate over network 106 with other systems and devices coupled to network 106. As shown in FIG. 1, computer system/server 12 is also coupled to the network 106. As used herein, an administrative user may include a site owner, site administrator, and/or other person having the proper credentials to perform the functions described herein.

Figure 3A:
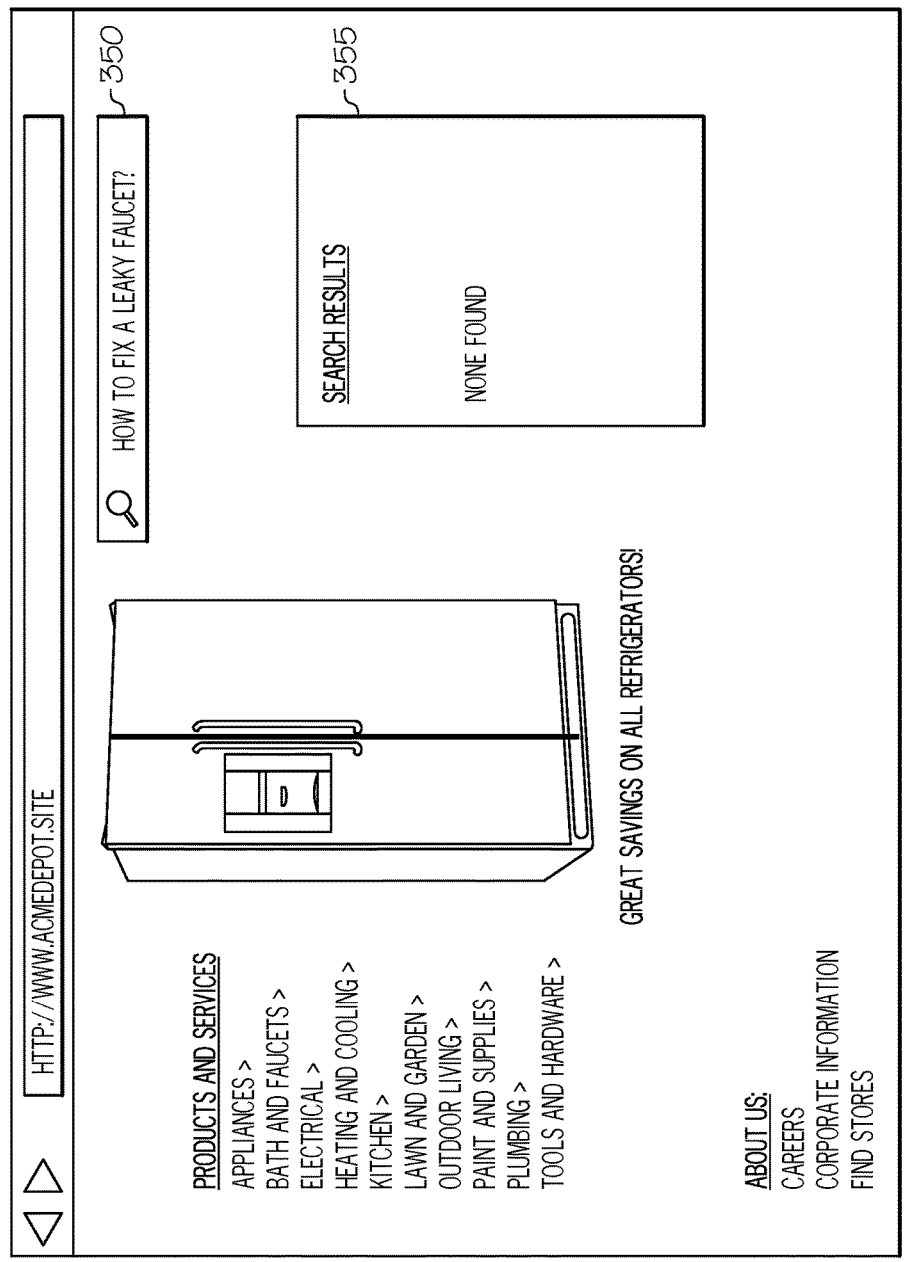
FIGS. 3A-B show example web pages 300, 310 having content related to a site-level search according to illustrative embodiments.

Referring now to FIG. 3A, in conjunction with FIG. 2A, example web page 300 having content related to a site-level search is shown. In this example, web page 300 is related to ecommerce merchant, ACME Depot. In the embodiment shown, administrative user 112 executes a first search query 114 at client device 102. Client device 102 transmits first search query 114 to computer system/server 12 via network 106. For example, administrative user 112 types a textual search query into a query field of a web page of a site-level search engine interface displayed on client device 102, which is then transmitted via network 106 to computer system/server 12. In another embodiment, first search query 114 is instead sent to a proxy server (not shown), which then transmits the first search query 114 to computer system/server 12. Other configurations are possible. As shown in FIG. 3A, administrative user 112 navigates to the ACME Depot website (i.e., web page 300) and executes first search query 114 (i.e., 'How to fix a leaky faucet?') at client device 102 by typing the phrase into search box 350.

Result set generation component 152 of system 72, as executed by computer system/server 12, is configured to locate relevant information in response to first search query 114 entered by administrative user 112 and provide first result set 134. In an embodiment, result set generation component 152 searches document index database 117 coupled to computer system/server 12, and first result set 134 responsive to first search query 114 is displayed to client 102.

In an embodiment, document index database 117 contains a list of potential search queries which may be used by a consumer. For each search query listed in the document index database 117, document index database 117 stores the search query, a document identifier corresponding to a document file (e.g., a database entry, a web page, a media file, Portable Document Format (PDF) file, and text document, etc.) related to the search query, and a relevance score for each search query/document file combination. In an embodiment, a document file will provide information related to an item or product. Search results may be returned in descending order of relevance score. The relevance score of each document may be represented by a positive number. The higher the number, the more relevant the document file. A relevance score may be computed based on a predefined formula. In some instances, a relevance score can be tuned by a system, user, super user, administrator, or the like.

FIG. 4A shows an example data structure 410 for implementing document index database 117. Data structure 410 includes a search query, first document identifier, first document relevancy score, second document identifier, second document relevancy score, etc. Document identifier is a key to document file database 118. As shown, document index database 117 includes a row for search query 'How to fix a leaky faucet?' (i.e., first search query 114) and a row for search query 'Faucet repair' (i.e., second search query 134). In an embodiment, document files may be stored in document file database 118 coupled to computer system/server 12.

FIG. 4B shows an example data structure 420 for implementing document file database 118. Data structure 420 includes a document identifier, display information, and document location link (e.g., URL). Display information includes text which will be displayed in a result set which, when selected (e.g., clicked) by a user, navigates the user to a document file via document location link. Data structures 410, 420 are exemplary only and may include other or different information or tables than as described above consistent with principles of the invention.

Referring back to FIGS. 2A and 3A, result set generation component 152 searches document index database 117 using first search query 114 to generate first result set 134. To that end, search phrase 'How to fix a leaky faucet?' is compared against the search query column in document index database 117 to determine matching rows. Document identifiers 155 and 199 are returned with relevant scores 2 and 1, respectively. In this example, only document files having a relevant score greater than 2 are to be displayed in a result set. Since there are no document files associated with first search phrase 114 having a relevant score greater than 2, search results area 355 displays no results.

Figure 3B:
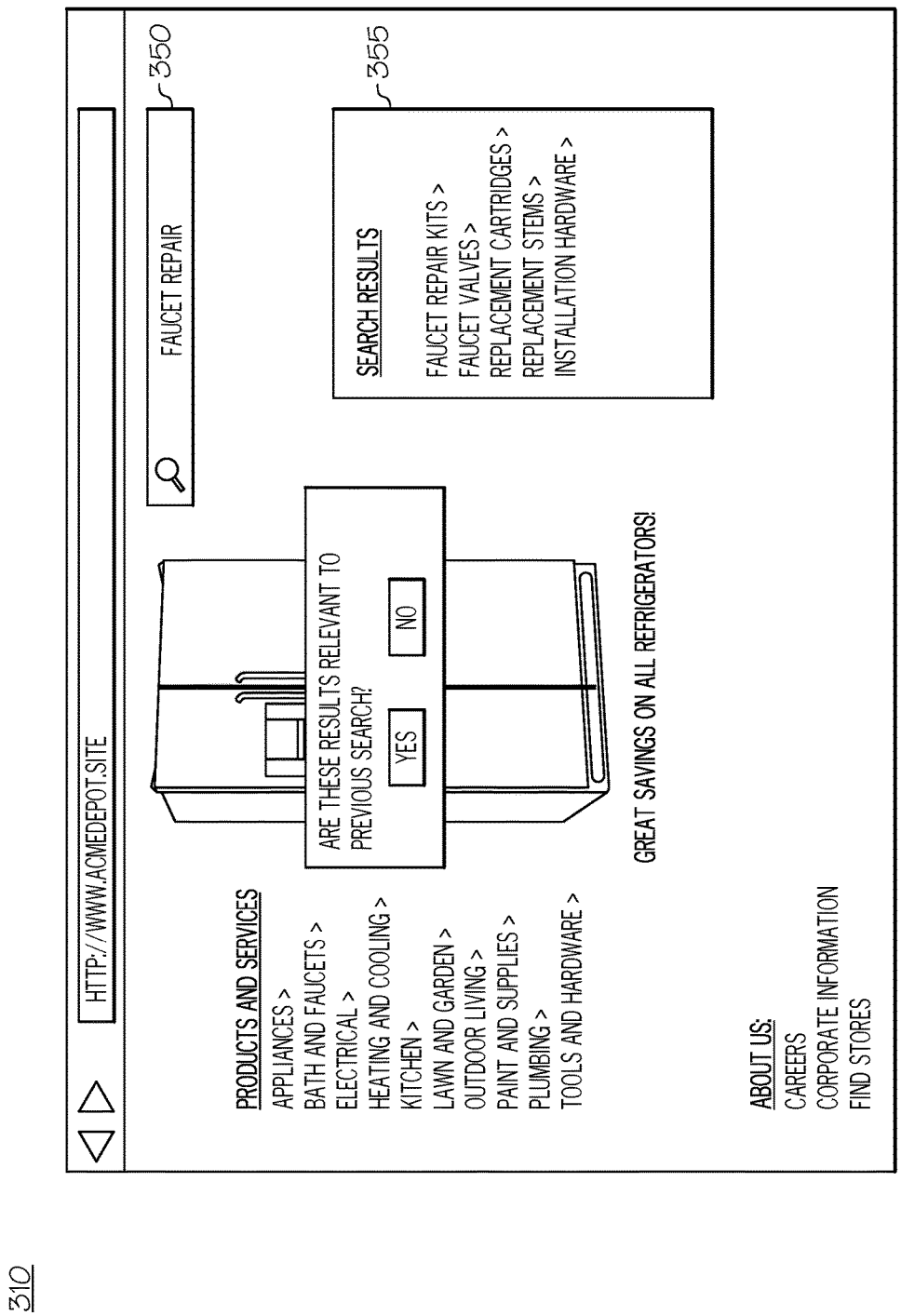

Referring now to FIG. 3B, in conjunction with FIG. 2B, a second example web page 310 having content related to a second site-level search is shown. In the embodiment shown, administrative user 112 executes a second search query 124 at client device 102 via a web page. Client device 102 transmits second search query 124 to computer system/server 12 via network 106. As described earlier, administrative user 112 types a second textual search query into a query field of a web page of a site-level search engine interface displayed on client device 102, which is then transmitted via network 106 to computer system/server 12. In another embodiment, second search query 124 is instead sent to a proxy server (not shown), which then transmits the second search query 124 to computer system/server 12. As shown in FIG. 3B, administrative user 112 executes a second search query 124 (i.e., 'Faucet repair') at client device 102 by typing the phrase into search box 360 on the ACME Depot website (i.e., web page 310).

Result set generation component 152 is configured to locate relevant information in response to second search query 124 from administrative user 112 and provide second result set 144 to client 102 via network 106. To that end, search phrase 'Faucet repair' is compared against the search query column in document index database 117. Document identifiers 125, 130, 134, 141, 155, and 99 are returned with relevant scores 5, 5, 5, 4, 3 and 2, respectively. As stated earlier, only document files having a relevant score greater than 2 will be displayed in a result set. Therefore, document identifiers 125, 130, 134, 141, and 155 are used to retrieve document file information from document file database 118 to generate second result set 144. Using the document identifiers, display information and a document location link for each document file will be used to display second result set 144 in search results area 365. In this example, text including links ("URLs") to product web pages for Faucet Repair Kits, Faucet Valves, Replacement Cartridges, Replacement Stems, and Installation Hardware are displayed in search results area 365 for a consumer to select.

As shown in FIGS. 2A-B, query association component 154 of system 72, as executed by computer system/server 12, is configured to associate the second result set 144 with first search query 114 so that subsequent executions of first search query 114 generate a result set that includes the desired query results. The user may wish to associate the second result set 144 with first search query 114 when first result set 134 yields little or no relevant results (e.g., below a predefined threshold), while second result set 144 provides relevant results. In the example depicted in FIGS. 3A-B, it is foreseeable a consumer may search 'How to fix a leaky faucet?' rather than 'Faucet repair' when browsing for products which may help the consumer fix his/her faucet. Therefore, it may be in the best interest of ACME Depot to associate second result set 144 with first search query 114 so that the user can easily navigate to different product pages when attempting to repair a faucet.

In an embodiment, the association may be triggered by administrative user 112 performing a user action once second result set 144 is displayed rather than requiring administrative user 112 to manually make the changes via an administrative web page or other application. For example, administrative user 112 may enter a natural language command (e.g., "Please save these results with search phrase 'How to fix a leaky faucet?'") into the web page's search box after second result set 144 is displayed to associate second result set 144 with first search query 114 for subsequent executions of first search query 114. In another example, administrative user 112 may answer affirmatively to an actionable question, such as via a pop-up box or window.

In an embodiment, query association component 154 may update the document identifiers and relative scores associated with first search query 114 based on the document identifiers and relative scores associated with second search query 124. Referring back to FIG. 3B, administrative user 112 answers affirmatively (i.e., clicks 'YES') to pop-up box 370 when second result set 144 is displayed in search results box 365 to associate second result set 144 with first search query 114. FIG. 4C shows the associated rows in document index database 117 after the association has been completed. The document identifiers and relative scores associated with first search query 114 have been updated based on the values stored for second search query 124. In other words, first search query 114 is associated with document identifiers 125, 130, 134, 141, and 155 (and their respective relevant scores) so that any subsequent executions of first search query 114 will include second result set 144.

Figure 5:
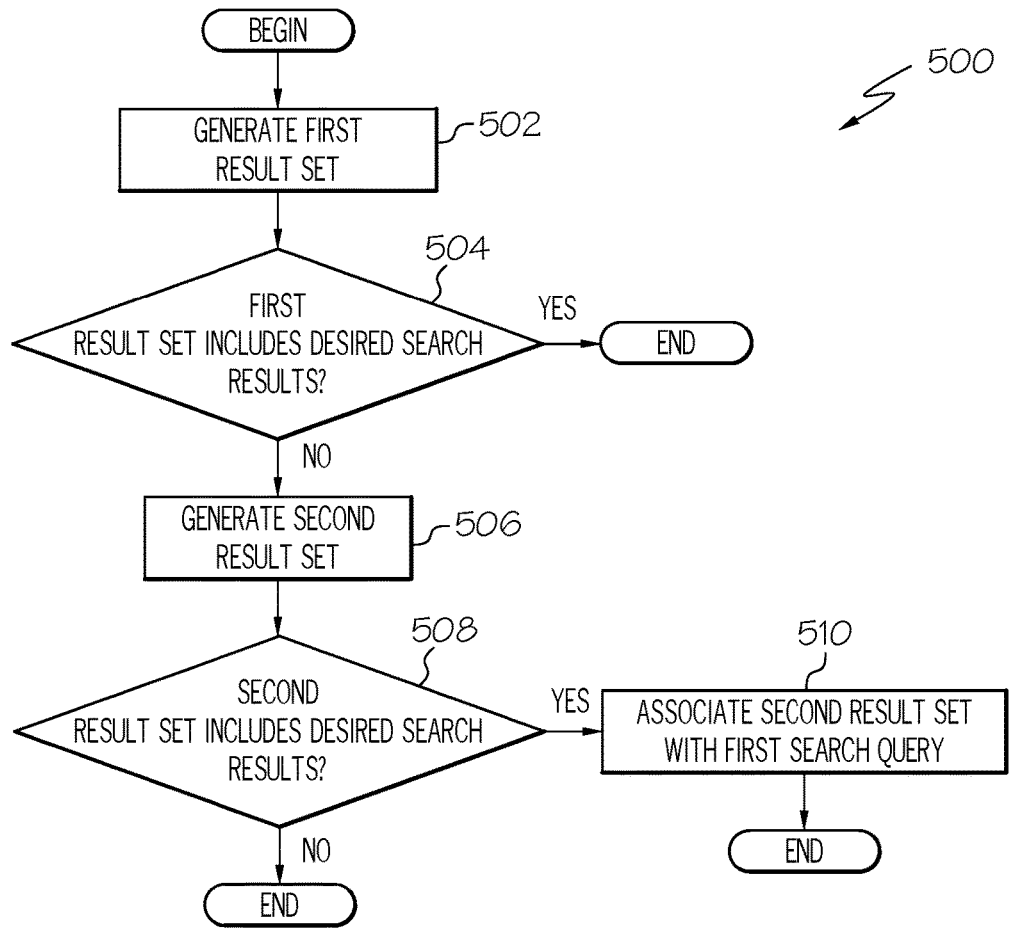
FIG. 5 shows a process flowchart 500 for calibrating site-level search results by associating a set of search results of a second search query with a first search query for subsequent uses of the first search query according to illustrative embodiments.

Referring now to FIG. 5, in conjunction with FIGS. 1, 2A, and 2B, an implementation of a process flowchart 500 for calibrating site-level search results by associating a set of search results of a second search query with a first search query for subsequent uses of the first search query is shown. At step 502, result set generation component 152 generates a first set of query results based on a first search query entered a site administrator. At step 504, a determination is made whether the first result set includes desired search results. If not, at step 506, result set generation component 152 generates a second set of query results based on a second search query entered by the site administrator. At step 508, a determination is made whether the second result set includes the desired search results. If so, at step 510, query association component 154 associates the second result set with the first search query so that subsequent execution of first search query generates a result set that includes the desired results.

Process flowchart 500 of FIG. 5 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for calibrating site-level search results by associating a set of search results of a second search query with a first search query for subsequent uses of the first search query. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for calibrating site-level search results by associating a set of search results of a second search query with a first search query for subsequent uses of the first search query. In this case, the service provider can create, maintain, support, etc., a computer infrastructure that performs the process steps of the invention for one or more consumers. In return, the service provider can receive payment from the consumer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for calibrating site-level search results by associating a set of search results of a second search query with a first search query for subsequent uses of the first search query. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for calibrating site-level search results, the method comprising:

generating a first result set based on an execution of a first search query from an administrator of an electronic commerce site;

determining, based on an analysis of the first result set, the first result set does not include one or more desired query results;

generating a second result set based on an execution of a second search query from the administrator of the electronic commerce site;

determining, based on an analysis of the second result set, the second result set includes the one or more desired query results;

automatically associating the second result set with the first search query; and returning a set of document files corresponding to the one or more desired query results when the first search query is subsequently executed by a third party searcher, who is not the administrator of the electronic commerce site.

2. The computer-implemented method of claim 1, wherein the second result set is associated with one or more document files.

3. The computer-implemented method of claim 1, further comprising associating the second result set with the first search query responsive to a user action.

4. The computer-implemented method of claim 3, wherein the user action includes entering a command in a search box or providing an affirmative response to an actionable question.

5. The computer-implemented method of claim 2, wherein each of the one or more document files is associated with a document identifier and a relevant score.

6. The computer-implemented method of claim 5, wherein associating the second result set with the first search query includes associating each document identifier and a relevant score of the one or more document files to the first search query.

7. The computer-implemented method of claim 2, wherein the one or more document files is selected from a group consisting of: a database entry, a web page, a media file, Portable Document Format (PDF) file, and text document.

8. A computer program product for calibrating site-level search results, and program instructions stored on the computer readable storage device, to:

generate a first result set based on an execution of a first search query from an administrator of an electronic commerce site;

determine, based on an analysis of the first result set, the first result set does not include one or more desired query results;

generate a second result set based on an execution of a second search query from the administrator of the electronic commerce site;

determine, based on an analysis of the second result set, the second result set includes the one or more desired query results;

automatically associate the second result set with the first search query; and return a set of document files corresponding to the one or more desired query results when the first search query is subsequently executed by a third party searcher, who is not the administrator of the electronic commerce site.

9. The computer program product of claim 8, wherein the second result set is associated with one or more document files.

10. The computer program product of claim 8, further comprising program instructions to associate the second result set with the first search query responsive to a user action.

11. The computer program product of claim 10, wherein the user action includes entering a command in a search box or providing an affirmative response to an actionable question.

12. The computer program product of claim 9, wherein each of the one or more document files is associated with a document identifier and a relevant score.

13. The computer program product of claim 12, further comprising program instructions to associate the second result set with the first search query by associating each document identifier and relevant score of the one or more document files to the first search query.

14. The computer program product of claim 9, wherein the one or more document files is selected from a group consisting of: a database entry, a web page, a media file, Portable Document Format (PDF) file, and text document.

15. A computer system for calibrating site-level search results, the computer system comprising:
    a memory medium comprising program instructions;
    a bus coupled to the memory medium; and
    a processor for executing the program instructions, the instructions causing the system to:
        generate a first result set based on an execution of a first search query from an administrator of an electronic commerce site;
        determine, based on an analysis of the first result set, the first result set does not include one or more desired query results;
        generate a second result set based on an execution of a second search query from the administrator of the electronic commerce site;
        determine, based on an analysis of the second result set, the second result set includes the one or more desired query results;
        automatically associate the second result set with the first search query; and
        return a set of document files corresponding to the one or more desired query results when the first search query is subsequently executed by a third party searcher, who is not the administrator of the electronic commerce site.

16. The computer system of claim 15, wherein the second result set is associated with one or more document files, wherein the one or more document files is selected from a group consisting of: database entry, a web page, a media file, Portable Document Format (PDF) file, and text document.

17. The computer system of claim 15, further comprising program instructions to associate the second result set with the first search query responsive to a user action.

18. The computer system of claim 17, wherein the user action includes entering a command in a search box or providing an affirmative response to an actionable question.

19. The computer system of claim 16, wherein each of the one or more document files is associated with a document identifier and a relevant score.

20. The computer system of claim 19, further comprising program instructions to associate the second result set with the first search query by associating each document identifier and relevant score of the one or more document files to the first search query.

* * * * *